United States Patent [19]
Marcus

[11] 4,068,930
[45] Jan. 17, 1978

[54] VISOR ASSEMBLY AND COVERED VANITY MIRROR

[75] Inventor: Konrad H. Marcus, Holland, Mich.

[73] Assignee: Prince Corporation, Holland, Mich.

[21] Appl. No.: 754,279

[22] Filed: Dec. 27, 1976

[51] Int. Cl.² ............................................. G02B 5/08
[52] U.S. Cl. ................................. 350/277; 350/307; 296/97 R
[58] Field of Search ............... 350/277, 279, 307, 306, 350/305, 65, 288; 296/97 R, 97 B, 97 H

[56] References Cited
U.S. PATENT DOCUMENTS

| | | | |
|---|---|---|---|
| 3,738,238 | 6/1973 | Hager | 350/65 |
| 3,740,981 | 6/1973 | Patriquin | 350/65 |
| 3,843,236 | 10/1974 | Kurz, Jr. | 350/307 |
| 3,926,470 | 12/1975 | Marcus | 296/97 H |

*Primary Examiner*—Jon W. Henry
*Attorney, Agent, or Firm*—Fisher, Gerhardt & Groh

[57] ABSTRACT

A visor assembly including a vanity mirror supported on a visor in a one piece housing including a frame and hinged cover. Protection against flying glass fragments in the event of shattering of the mirror is provided by the cover and also by a flexible backing on the mirror which also holds a mounting arrangement for fastening the mirror and housing to the visor.

9 Claims, 4 Drawing Figures

VISOR ASSEMBLY AND COVERED VANITY MIRROR

This invention relates to visor assemblies incorporating vanity mirrors which are adapted for use on vehicles.

Sun visors are customarily used in vehicles to shield the occupants eyes from strong sunlight. Because of the eye level location of such visors they have been found convenient for locating vanity mirrors which usually are fastened to the visor by means of clamps or other fasteners. With a great concern for safety in the operation of vehicles, sun visors usually are padded to reduce the possibility of injury. The mirror however, which is located on the visor can present some problems with respect to shattered glass and stray reflections which may interfere with the operators vision.

With the foregoing in mind, a visor assembly is contemplated that includes a vanity mirror mounted on a visor so that the mirror is covered when it is not in use.

It is an object of the invention to provide a visor assembly including a vanity mirror incorporating a unique housing for the mirror which serves to cover the mirror when it is not being used.

Still another object of the invention is to provide a visor assembly incorporating a vanity mirror in which the mirror reduces the possibility of glass fragments separating from the assembly upon shattering of the mirror and at the same time acts to support a housing which covers the mirror relative to the visor.

A visor assembly incorporating a vanity mirror is provided in which the mirror has a backing plate mounted relative to a glass mirror to prevent separation of glass fragments if the mirror is shattered in a collision and in which the backing plate supports a mounting structure serving to hold the mirror and its housing relative to the visor structure. The housing is a one piece frame and cover structure which closes or covers the reflective surface of the mirror when the mirror is not being used to prevent stray reflections and to protect occupants of the vehicle from contact with the glass face of the mirror in the event of a collision.

The foregoing and other objects and advantages of the invention will become apparent from the following description and from the accompanying drawings in which.

Figure 1:
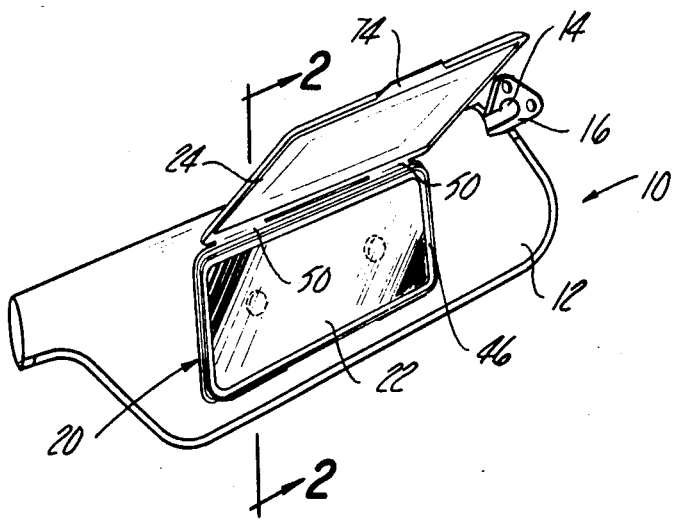
FIG. 1 is a perspective view of a visor assembly embodying the invention.
Figure 2:
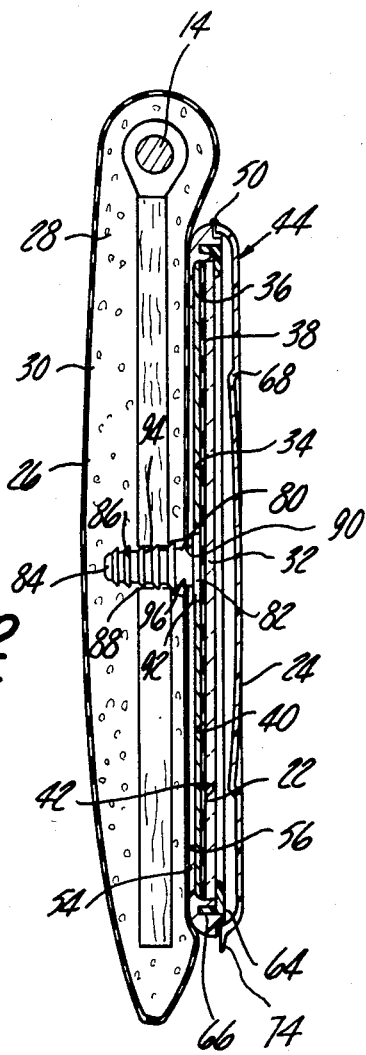
FIG. 2 is a cross-sectional view at an enlarged scale taken through the visor assembly on line 2—2 in FIG 1.

The visor assembly incorporating the principals of the invention is denoted generally at 10 and is shown for demonstration purposes as being installed on the passenger side of a vehicle although it could be installed also on the drivers side. The visor assembly 10 includes a visor 12 that is swingably supported on a rod 14 which has a swivel attachment 16 at its end connected to the vehicle just above the vehicle windshield. The visor can be moved from its storage position in which it is generally parallel against the ceiling of the passenger compartment or it can be moved to an operative position in which it is generally vertical and parallel either to the windshield or to a side window of the vehicle. The visor assembly 10 further includes a vanity mirror assembly 20 incorporating a reflective mirror 22 and a cover 24 which in FIG. 1 is shown in open position and in FIG. 2 is shown in a closed position.

the visor 12 as seen in FIG. 2 includes a core portion 26 which may be made of hard board and which may be covered with a padding 28 of plastic foam material or some other suitable padding material. The padding 28 may be further covered with more durable and decorative material such as cloth, leather, vinyl or the like.

As best seen in FIG. 2, the mirror 22 includes a glass panel 32 which can be drawn window glass having the customary reflective coating designated at 34 on the rear surface of the glass panel. The glass panel 32 is attached to a metal backing plate 36 of the same size and configuration as the glass panel 32 by an adhesive backing strip 38 which by way of example may be a double adhesive tape or if preferred, a polyvinyl chloride material of approximately 4 or 5 mills thickness at opposite sides of a polyethylene foam material or the equivalent having a thickness of approximately 0.010 to 0.030 inches. The outer surfaces formed by the polyvinyl chloride material may be coated with adhesive which adheres to the back surface 40 of the mirror and to the front surface 42 of the backing plate 36. With this construction, if the vanity mirror 22 is struck with a blow of sufficient force to break the glass panel 32, the steel backing plate 36 will deflect and bend and the broken glass will be retained by the adhesive material 38 to the backing plate 36.

The mirror subassembly 20 includes a housing 44 which serves to contain the mirror 22. The housing 44 includes a frame portion 46 and the cover portion 24 which are attached to each other for hinging movement by hinge portions 50. The frame 46, cover 24 and hinges 50 are formed of a single piece of homogeneous plastic material and are integral with each other.

The frame 46 of the housing 44 includes a border section which surrounds the perimeter of the glass panel 32. The border section includes a back flange 54 which engages the back surface 56 of the backing plate 36. At the outer periphery of the back flange 54 is a molding portion 58 which forms a groove 60 around the entire perimeter of the frame 46.

The glass panel 32 of the mirror is disposed in engagement with the back flange 54 and within the recess formed by the molding portion and is held in position by a bezel member 62 which also may be made of plastic material. The bezel member 62 includes a flange or leg portion 64 which engages the outer face 22 of the glass panel and a leg 66 which is disposed in the groove 60. After the mirror is disposed within the molding portion 58 the bezel 62 may be cemented in position or fused to the molding portion 58 by means of applying heat or by sonic welding.

The cover 24 which is formed integrally to the frame portion 46 has the same general outer contour as the frame portion and if desired a forward face portion may contain an indentation as indicated at 68 which serves not only as a reenforcement but also as a decoration.

Figure 4:
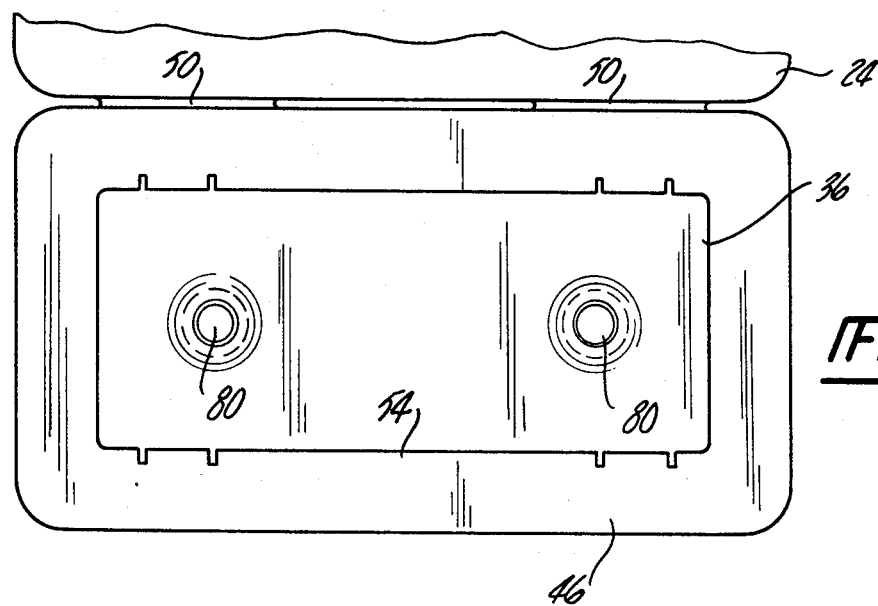
FIG. 4 is a rear view of a portion of the mirror subassembly.

The hinges 50 by which the cover and frame are held together are formed of the same plastic material and preferably have a thinner section than any section of either the frame or the cover to facilitate flexing. Also as seen in FIG. 4, the hinge portion 50 may be spaced apart longitudinally of the cover to form a pair of hinges.

Figure 3:
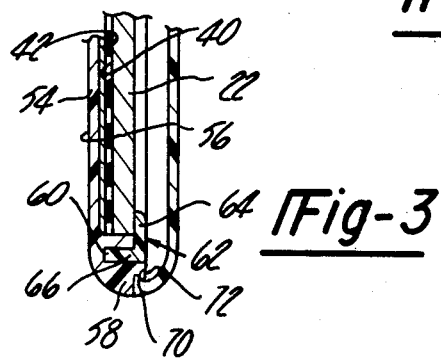
FIG. 3 is a cross-sectional view of a portion of the arrangements seen in FIG. 2 but at an enlarged scale.

The cover 24 may be held in closed position relative to the frame portion 46 by means of a latching arrangement as seen in FIG. 3 in which an edge of the frame opposite to the hinges 50 is provided with a groove 70. The cover 24 is formed with a complementary bead 72 which fits into the groove 70. The groove 70 and bead 72 are formed at opposite end portions of the cover and frame and due to the resiliency of the plastic material, the beads 72 snap into the corresponding complementary grooves 70 to retain the cover 24 in a closed position. To open the cover a projection forming a handle 74 is pulled to disengage the bead 72 from the groove 70.

The cover tends to remain in an open position. During manufacture the frame cover and hinge are molded as a single piece all disposed in substantially the same plane. Consequently, the frame and cover tend to move toward their as molded condition to retain the cover in its open position relative to the frame and mirror as seen in FIG. 1 when grooves 70 and beads 72 are disengaged.

The mirror subassembly 20 including the housing 44 and the reflective mirror 22 are held in position on the visor 12 by means of a pair of plastic fasteners 80. Each of the fasteners 80 includes a head portion in the form of a flange 82 and a stem 84 which has a plurality of spaced annular retaining rings 86. Each of the rings is formed with a circumferential beveled edge 88 so that the plurality of rings 86 form a saw toothed pattern. The plastic fasteners 80 are inserted through openings 90 which are surrounded by a flange portion 92 offset out of the plane of the metal backing plate 36 a distance sufficient to accommodate the head 82. With the backing plate 36 attached to the rear of the glass panel 32 the plastic fasteners 80 are maintained in position with their heads 82 contained between the mirror and the flange 92.

The visor 12 and particularly the core 26 is provided with an opening 94. Similarly, the padding 28 at the mirror side of the visor is provided with an opening 96. The mirror subassembly 20 is held in position relative to the visor 12 by insertion of the plastic fasteners 80 in the holes 94, 96 so that when the mirror is pressed relative to the visor, the annular rings 86 permit passage in one direction, for example, to the left as viewed in FIG. 2, and resist movement in the opposite direction to the right.

With the cover 30 in its closed position as viewed in FIG. 2, the reflective surface of the mirror 22 is covered so that stray reflections do not disturb the driver and serves to maintain the reflective surface clean and free of dust. In the event of a crash, the closed cover acts as a barrier between the occupants of the vehicle and the glass surface of the mirror. The occupants are further safeguarded by the flexible tape material adhering to the back of the glass panel 32 and also to the metal backing plate 36 so that even if the glass should shatter the particles of glass are held in position relative to each other.

A visor assembly has been provided in which a mirror which is protected against shattering fragments of glass coming in contact with an occupant of the vehicle is further encased within a housing made of a single homogeneous plastic molded part such that the housing forms a frame and a hinged cover for encasing the mirror and the mirror serves to hold the housing as well as the mirror in position relative to the visor.

The embodiments of the invention in which an exclusive property or privilege is claimed are defined as follows:

1. A visor and vanity mirror assembly comprising; a visor adapted for attachment to a vehicle, a housing supported on said visor, said housing including a relatively rigid frame portion and a relatively rigid cover portion, hinge means joining said frame and cover for movement of the latter between open and closed positions relative to said frame, said frame, cover and hinge means being of unitary, homogeneous plastic construction, said hinge means being relatively flexible and a mirror supported relative to said frame to be covered by said cover portion when the latter is in a closed position relative to said frame.

2. The combination of Claim 1 and further comprising attaching means operative between said mirror and said visor to secure said housing in position on said visor.

3. The combination of claim 2 in which said attaching means are connected at the rear surface of said mirror to project from said housing for cooperative engagement with attachment receiving portions of said visor.

4. The combination of claim 1 in which said frame and cover have an as molded condition in which said frame, cover and hinges are disposed in substantially the same plane and in which said cover tends to move from its closed position covering said mirror towards an as molded condition in which said cover is supported in an open position relative to said mirror.

5. The combination of claim 1 including a metal backing plate, adhesive means holding said metal backing plate to the rear surface of said mirror, and fastening elements held by said plate for engagement with complementary fastening portions of said visor to hold said mirror and housing in position relative to said visor.

6. The combination of claim 5 in which said adhesive means includes a flexible element with adhesive on opposed surfaces in engagement with said plate and said mirror, respectively.

7. The combination of claim 5 in which said fastening elements protrude from the rear portion of said backing plate and include annular retaining portions for engagement with side portions of openings in said visor.

8. The combination of claim 1 in which said frame portion has a mirror receiving cavity formed therein, and a bezel member engaging a forward surface of said mirror and fastened to said frame portion to retain said mirror in said cavity.

9. The combination of claim 1 in which the cover is held in closed relationship to said frame by latch means including complementary tongue and groove portions in said cover and frame for engagement with each other when said cover is in the closed position.

* * * * *